Feb. 6, 1923.

G. H. WITSAMAN

PNEUMATIC TIRE

Filed June 19, 1919

1,444,533

Inventor:
George H. Witsaman,
By Archur H. Ewald,
Attorney.

Patented Feb. 6, 1923.

1,444,533

UNITED STATES PATENT OFFICE.

GEORGE H. WITSAMAN, OF DAYTON, OHIO, ASSIGNOR OF ONE-HALF TO ABRAHAM BERNSTEIN, OF CINCINNATI, OHIO.

PNEUMATIC TIRE.

Application filed June 19, 1919. Serial No. 305,290.

*To all whom it may concern:*

Be it known that I, GEORGE H. WITSAMAN, a citizen of the United States, a resident of Dayton, in the county of Montgomery and State of Ohio, have invented certain new and useful Improvements in Pneumatic Tires, of which the following is a full, clear, and exact description, reference being had to the accompanying drawings, forming a part of this specification.

My invention relates to pneumatic tires, and has particular reference to the provision of a casing for such tires of improved and reinforced construction.

The principal object of the present invention is to provide a casing for pneumatic tires so reinforced and strengthened in construction as to provide increased security against punctures and other injuries. In the construction of a pneumatic tire it is usual to provide a carcass consisting of a plurality of layers either of rubberized fabric or cords and a tread usually of pure gum. The present invention contemplates the strengthening of both carcass and tread by the disposition of cords in the former and the imbedding of fine threads longitudinally or circumferentially in the gum of the tread as will be more fully set out in the following detailed description of the invention.

A further object of the invention is to provide additional security against skidding.

Further objects of the invention will appear from the following description thereof.

The letter A indicates the carcass and B the tread portion of the casing. The carcass A is constructed of a plurality of layers, in the illustrated example four in number, each consisting of rubberized cords 1 of the usual type disposed longitudinally or circumferentially of the casing. The several layers of the carcass, as well as the individual cords of each layer adhere together in the usual manner when the casing is cured.

Figure 1:
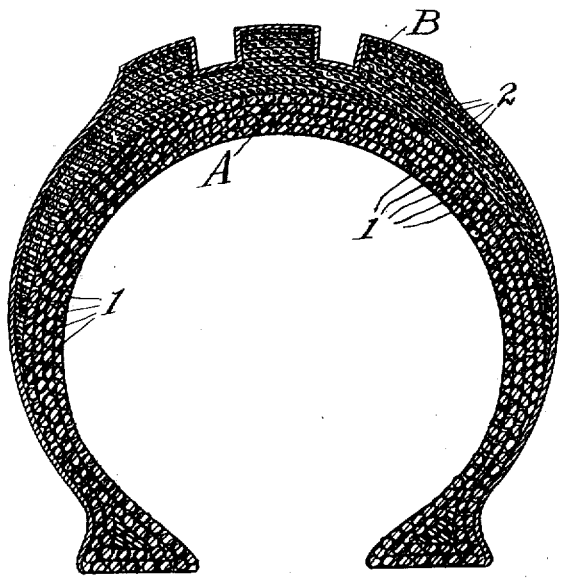
Figure 1 is a transverse section of a casing constructed in accordance with the present invention.
Figure 2:
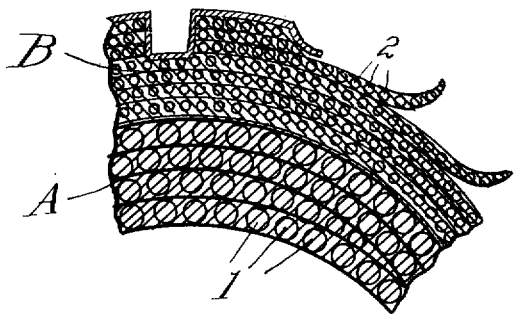
Figure 2 is a sectional view illustrating the method of constructing the casing.

The tread portion B of the casing comprises a large number of fine threads 2 disposed therein longitudinally or circumferentially of the casing. In constructing the tread portion in accordance with this invention, I have found it desirable to imbed the threads in layers of gum, the layers being assembled on the carcass to form the tread in the usual manner and as illustrated in Figure 2, the entire tread becoming unitary upon curing the casing.

The nature and value of the construction above described as applied to pneumatic tire casings will be fully apparent to those skilled in the art to which the same appertains. The imbedding of a large number of fine threads in the tread of the casing, the same being disposed longitudinally thereof, greatly strengthens the same and protects the casing against punctures and blowouts, and at the same time, as will be seen, as the tread portion wears and the fine threads are exposed on the surface thereof, and assist very materially in traction, and thus serve to prevent skidding.

Having thus fully described my invention which I claim as new, and desire to secure by Letters Patent, is:

A pneumatic tire casing comprising a carcass and a tread on said carcass, said carcass comprising a plurality of layers of cords, the cords of each layer being longitudinally disposed with reference to said casing, and said tread comprising gum and a plurality of threads imbedded throughout said gum longitudinally of the casing.

GEORGE H. WITSAMAN.